United States Patent
Grubin

(10) Patent No.: US 10,656,966 B1
(45) Date of Patent: *May 19, 2020

(54) DEEP-INSPECTION WEIGHTED ROUND ROBIN OF MULTIPLE VIRTUALIZED RESOURCES

(71) Applicant: Amazon Technologies, Inc., Seattle, WA (US)

(72) Inventor: Benjamin Philip Grubin, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/860,079

(22) Filed: Jan. 2, 2018

(51) Int. Cl.
G06F 9/46 (2006.01)
G06F 9/50 (2006.01)
G06F 9/54 (2006.01)

(52) U.S. Cl.
CPC ............ G06F 9/5033 (2013.01); G06F 9/546 (2013.01)

(58) Field of Classification Search
CPC ........................................................ G06F 9/52
USPC ......................................................... 718/104
See application file for complete search history.

(56) References Cited

U.S. PATENT DOCUMENTS

| | | | | |
|---|---|---|---|---|
| 2005/0240666 A1* | 10/2005 | Xu | ........................ | H04L 12/403 709/223 |
| 2009/0113440 A1* | 4/2009 | Dorny | ..................... | G06F 9/546 718/104 |
| 2009/0122766 A1* | 5/2009 | Hughes | ................. | H04L 45/122 370/336 |
| 2009/0217288 A1* | 8/2009 | Neubauer | ............... | G06F 9/505 718/105 |
| 2010/0211729 A1* | 8/2010 | Wang | .................. | G06F 13/1626 711/105 |
| 2014/0082629 A1* | 3/2014 | Ash | ........................ | G06F 9/5088 718/105 |
| 2014/0181833 A1* | 6/2014 | Bird | ........................ | G06F 9/5016 718/105 |
| 2015/0124832 A1* | 5/2015 | Ma | .......................... | H04L 45/74 370/412 |
| 2015/0295853 A1* | 10/2015 | Pell | ........................ | G06F 9/5077 709/226 |
| 2015/0296002 A1* | 10/2015 | Pell | ......................... | G06F 9/505 709/226 |
| 2015/0296006 A1* | 10/2015 | Pell | ........................ | G06F 9/5077 709/226 |
| 2015/0355943 A1* | 12/2015 | Harris | ................... | G06F 9/5083 718/104 |

(Continued)

Primary Examiner — Mehran Kamran
(74) Attorney, Agent, or Firm — Nicholson De Vos Webster & Elliott, LLP

(57) ABSTRACT

Techniques for intelligent use of multiple virtualized resources via deep-inspection weighted round robin are described. Hardware resources shared between multiple clients can be intelligently selected between by the clients to perform operations. Weights of operation queues for the hardware resources that are assigned to instances can be provided to the clients to give the clients insight into how busy particular hardware resources are and what types of operations the hardware resources will be performing. In some embodiments, the clients can make use of a weighted round robin scheme to select between candidate hardware resources, allowing clients to effectively distribute operations between different hardware resources.

19 Claims, 8 Drawing Sheets

(56) References Cited

U.S. PATENT DOCUMENTS

| | | | |
|---|---|---|---|
| 2015/0381709 A1* | 12/2015 | Word | H04L 49/90 709/203 |
| 2016/0071325 A1* | 3/2016 | Callaghan | G06T 19/006 |
| 2016/0154674 A1* | 6/2016 | Lin | G06F 9/4881 718/1 |
| 2016/0306645 A1* | 10/2016 | Serebrin | G06F 9/45558 |
| 2017/0060583 A1* | 3/2017 | Hamelin | G06F 9/3016 |
| 2017/0078209 A1* | 3/2017 | Miklos | H04W 28/0236 |
| 2017/0206103 A1* | 7/2017 | Arndt | G06F 9/45533 |
| 2017/0332421 A1* | 11/2017 | Sternberg | H04W 76/11 |
| 2018/0115495 A1* | 4/2018 | Branover | G06F 1/3234 |
| 2018/0189090 A1* | 7/2018 | Hoppert | G06F 9/45558 |
| 2018/0217951 A1* | 8/2018 | Benisty | G06F 13/1642 |
| 2018/0332138 A1* | 11/2018 | Liu | G06F 9/4887 |

* cited by examiner

DEEP-INSPECTION WEIGHTED ROUND ROBIN OF MULTIPLE VIRTUALIZED RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
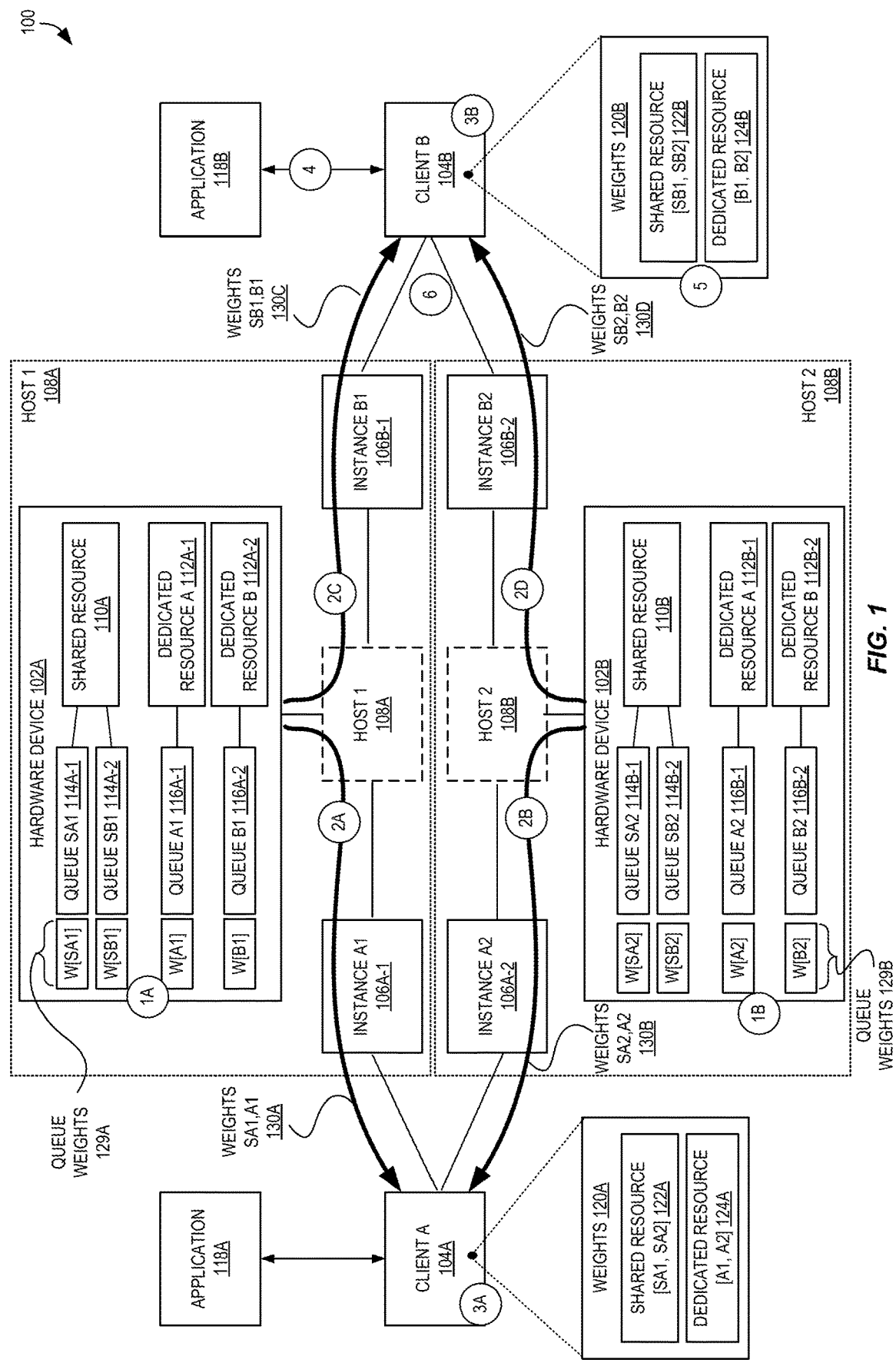
FIG. 1 is a block diagram illustrating an environment for deep-inspection weighted round robin of multiple virtualized resources according to some embodiments.

Various embodiments of methods, apparatus, systems, and non-transitory computer-readable storage media for intelligent use of multiple virtualized resources via deep-inspection weighted round robin are described. According to some embodiments, hardware resources shared between multiple clients can be intelligently selected between by the clients to perform operations. In some embodiments, weights of operation queues for the hardware resources that are assigned to instances that service the clients can be provided to the clients to give the clients insight into how busy particular hardware resources are. In some embodiments, the clients can make use of an intelligent weighted round robin scheme to select between candidate hardware resources, allowing clients to effectively distribute operations amongst different hardware resources.

Moreover, in some embodiments the hardware resources are virtualized hardware resources and service the operation queues according to a round robin technique. Accordingly, in some embodiments, clients can optimally select an optimal hardware resource to be used for performing an operation, which can include use of a deep-inspection weighted fair queuing technique to optimally distribute work between hardware resources available to the clients.

With many current technologies, it is common for multiple entities—such as virtualized compute instances (e.g., virtual machines (VMs), containers), applications, etc.—to share common underlying hardware resources. In such environments, it is important that one such entity is not able to "starve" other entities from being able to access a particular resource. To this end, sophisticated scheduling algorithms have been developed as fairness measures to ensure that each entity (e.g., a VM, application, device) gets a fair share of an underlying resource (e.g., a processor, memory, packet processing circuitry, etc.). For example, some common approaches that have been developed to ensure fairness are referred to as "fair queuing" scheduling techniques. Fair queuing is a family of scheduling algorithms used in some process and network schedulers. The concept implies a separate queue (e.g., a packet queue, job queue, etc.) for each entity (e.g., a traffic flow, a program process, etc.) as opposed to traditional approaches utilizing a single queue for all entities attempting to share the resource. A number of complex fair queuing algorithms exist, such as weighted fair queuing (WFQ), deficit round robin (DRR), etc., that allow operations placed in multiple queues to be serviced in a fair manner.

However, these traditional scheduling algorithms cannot solve problems arising in a new category of environments, such as those involving virtualized shared resources. For example, many new systems utilize "service" based architectures in which multiple entities (e.g., applications, which may execute inside or outside of a service provider network) attempt to utilize hardware resources provided as a service. For example, many types of hardware resources could be used by such a service (e.g., a virtual hardware security module (HSM) service) that are shared, such as general-purpose or special-purpose processors (e.g., graphics processing units (GPUs)), memories, accelerator cards (e.g., network accelerators, graphics accelerators, crypto-mining accelerators), etc. With regard to an HSM, an HSM is physical computing device (implemented as or within a "card") that safeguards and manages digital keys for strong authentication and provides crypto-processing. HSMs are often coupled with a host computing device using one or more interfaces or buses, such as via a Peripheral Component Interconnect (PCI) interface like PCI Express (PCI-e), Small Computer System Interface (SCSI), Universal Serial Bus (USB), etc.

In such cases, an underlying hardware resource (of or attached/coupled with a host device) can be made available via a number of instances (also referred to as "compute instances" such as VMs, containers, applications, etc.) that may be executed at/by the host. Thus, one or more compute instances may act as a "middleman" to provide (possibly remote) clients/applications access to hardware resources.

Thus, compute instances may utilize queues to access a shared resource; however, although existing fair queuing approaches alone might be able to ensure fairness between multiple compute instances, such approaches cannot provide fair queuing between the actual clients/applications that use the compute instances to access the hardware resources of the hardware device. For example, with a common shared hardware resource, a first compute instance could service a huge number of clients while a second compute instance might service one client (or only a few clients)—in this case, the smaller number of clients of the second compute instance would get a disproportionate amount of access to the shared resource compared to the many clients utilizing the first compute instance for access to the shared resource. As in many cases it is important for clients/applications to have a good experience in using shared hardware resources, it is critical to avoid client requests being dropped or being subjected to significant processing delays—however, this cannot typically be ensured.

Further, in some environments (such as larger service provider networks) there may be multiple different hardware resources of a same type that a client might be able to choose between to perform a task. In such cases, a client similarly cannot be ensured fairness of access to shared hardware resources. For example, multiple different compute instances might provide access to a first type of shared hardware resource. In such a scenario, there could be ten clients self-load balancing among ten backend resources, and each client only knows about its own job requests. If a first client has submitted twenty job requests for hardware resource A, and then a second client needs to issue a request, the second client doesn't know not to send it to hardware resource A, and might thus send the request to hardware resource A. Thus, while some or all of the nine other hardware resources may be able to service the second client's request extremely easily (e.g., due to being completely unused or having few jobs to perform), the first hardware resource might provide the second client with unsatisfactory performance due to needing to share the underlying resource among multiple clients and/or job requests.

Additionally, in some environments not every operation is the same in terms of its complexity or "weight." In many existing systems, the operations or job tasks to be processed (e.g., using a fair queuing enabled resource) are of a similar weight or complexity. For example, when referring to a general-purpose computer, by and large an instruction is relatively similar to other instructions in terms of time to perform the instruction. Thus, although some instructions may take substantially more time—e.g., ten times as much—this differential is small enough that significant impacts do not result.

In contrast, in some environments, one type of "heavy" request could take ten full seconds of time, while another "light" request may require only a fraction of a millisecond. Thus, if queues are utilized with both types of these operations, and a traditional fair queuing scheme is employed that only relies upon how many requests are queued up, problems in responsiveness may result due to the different types of requests. For example, a client may inadvertently send a "light" operation to a shared resource that has queued a large number of "heavy" operations, thus imparting significant processing delays for that light operation, while other shared resources of the same type may have been more available.

Additionally, while a client may understand how "heavy" its own requests are, it has no sense of which other requests in a queue (corresponding to an instance and serviced by a hardware resource) may be heavy or not heavy. Further, it can be very difficult and resource intensive for a client to keep track of how many and what heaviness of requests it alone has sent, and even if it could manage this information well, it still has no visibility into requests from other clients.

Thus, clients simply cannot be smart enough regarding how to best self-load balance to determine where to submit certain requests to, resulting in inefficiencies for the client (in terms of increased time needed to perform requests) as well as the provider network providing the hardware resources (in terms of slow performance and underutilized or idle resources). For example, one hardware resource may be tremendously overloaded while another is sparingly used, resulting in performance being impacted for all clients.

Accordingly, embodiments disclosed herein provide clients utilizing deep-inspection weighted round robin of multiple virtualized resources in which clients have visibility into weights of queues of hardware resources and can intelligently select ones of the hardware resources to minimize per-operation execution time and maximize overall system performance. For example, FIG. 1 is a block diagram illustrating an environment 100 for deep-inspection weighted round robin of multiple virtualized resources according to some embodiments.

FIG. 1 includes multiple clients—client A 104A and client B 104B—that utilize hardware resources 110/112 provided by hardware devices 102A-102B. Each of the clients 104A-104B, in some embodiments, is a software component (e.g., a package, library, or complete application) used by an application 118A-118B to perform operations involving hardware resources. For example, an application 118A (e.g., a computer program such as a web application, special-purpose/custom application, etc.) may wish to perform a particular type of operation (e.g., an encryption operation), and call a client A 104A to perform the operation (e.g., via a function/method call, web service call, etc.). Client A 104A may then utilize its logic to determine what type of operation(s) are to be performed, determine which hardware resource(s) may be available to perform the operations(s), and interact with the hardware resource(s) (e.g., via an instance) to actually perform the operations.

A client 104 may be embedded within an application 118 and thus effectively be part of the application 118 (e.g., executed together on a same computing device), or can be distinct from the application 118 (e.g., on a same or different computing device) and used by one or even multiple applications 118. The applications 118 can be of a variety of types, perform a variety of types of tasks, and be executed in a variety of environments. For example, applications 118 (and/or hardware resources) may be located within an organization's on-premise network, in a service provider network (or "cloud"), etc. Further, the applications 118 may execute as a traditional application on top of an operating system on a computing device, in/on a VM or container, etc.

Although FIG. 1 depicts two clients 104A-104B and two hardware devices 102A-102B providing hardware resources, in some embodiments potentially many more clients may exist that utilize hardware resources of potentially many more hardware devices. As one illustrative example, the hardware devices 102A-102B could be HSMs and many different applications 118A-118B that process application programming interface (API) calls (e.g., to a web service, such as that provided by a provider network) may seek to use hardware resources of the HSM hardware devices for performing encryption/authentication type operations.

The types of hardware resources that can be utilized according to the techniques disclosed herein can be varied. For example, the hardware resources may comprise a general-purpose processor, special-purpose processor, accelerator, input/output (I/O) device, etc. These hardware resources, in some embodiments, are virtualized hardware resources in that they can be shared by multiple clients/users, e.g., via multiple instances.

In some embodiments, a single hardware device 102A (e.g., a "card" device that is coupled with a host device 108A via an interface or bus, such as a PCI/PCI-e interface) may provide one or multiple different "types" of hardware resources. For example, as shown in FIG. 1, a hardware device 102A may include zero, one, or more shared resources 110A (upon which multiple clients may access), and zero, one, or more (here, two) dedicated resources 112A (that are "reserved" for a single instance, client, etc.). As one example, in some embodiments a hardware device 102A that is a HSM could include a management processor (or "MCPU") that is a shared resource 110A and multiple other processors (e.g., general purpose CPUs) that are dedicated resources 112A that may be dedicated to a particular instance.

For example, a "fast-path" operation could be sent straight to a dedicated resource 112A-1, whereas a "slow-path" operation may go to a shared resource 110A, and optionally may continue by then going to a dedicated resource 112A-1 for further processing.

In some embodiments, hardware resources of a hardware device 102A can be accessed by a client 104A directly—e.g., via one or more packets sent between the two. However, in some embodiments a hardware device 102A is coupled with a host device 108A and the client 104A may access the hardware resources of a hardware device 102A via an instance 106. An instance 106 may comprise an application that receives requests (e.g., to perform an operation) from clients 104, passes those requests on to the hardware devices 102A-102B, and possibly receives responses from the hardware devices 102A-102B and passes such responses back to the clients 104A-104B. In some embodiments, an instance 106 may act—from the perspective of a client—as the hardware resource, though in other embodiments the actual hardware resources are "visible" to the clients.

As described herein, embodiments utilize a modified weighted fair queuing technique that provides clients 104 access to weights of one or more of per-instance operation queues to provide visibility into the busyness of particular hardware resources, and further, allows for the "weight" of operations to be accounted for. As a result, clients 104 can make intelligent decisions in terms of which particular hardware resources the clients choose to perform particular operations.

For example, in some embodiments, the hardware devices 102A-102B can determine the difficulty/weight of particular operations (also commonly referred to as "jobs" or "job requests"). Thus, a hardware resource (e.g., shared resource 110A or dedicated resource A 112A-1) can implement a round robin technique to perform an approximately equivalent amount of work for each instance, based upon a knowledge of what a cost is for a particular operation.

Further, in some embodiments, a queue 114/116 can be utilized for a resource that is "assigned" to a particular instance (or, in some embodiments, to a particular client). Thus, instead of existing techniques utilizing a single queue for a hardware resource, through use of instance-specific queues each queue can be dealt with using weighted fair queuing and thus the hardware resource can fairly rotate between these queues, and moreover, embodiments can also calculate a "weight" 129A-129B for each such queue, and communicate it back up to the corresponding clients (e.g., as weights 130A-130D). As a result, the clients 104A-104B are made aware of how much work is pending for each of the queues (of the instances that the clients 104A-104B interact with), and can intelligently determine which of their associated queues (for a hardware resource of a "type" that can service a desired operation) is best via having a smallest queue weight.

In some embodiments, a single hardware device 102A may thus have different per-instance queues for each type of shared resource 110A. Accordingly, some operations (e.g., a management command) for a first type of resource may be placed into a separate queue for that single instance (e.g., queue SA1 114A-1) while other types of operations for a second type of resource may be placed into a different queue (e.g., queue A1 116A-1) for that same instance but for the different type of resource (e.g., dedicated resource A 112A-1).

Accordingly, some embodiments can thus prevent, for example, a client from halting sending operations to a hardware device 102A simply because one piece of the hardware (e.g., shared resource 110A) is busy when another piece (e.g., dedicated resource A 112A-1) that can be used independently is not busy. For example, in scenarios with "dedicated" hardware (for example, a dedicated resource 112 such as a CPU core that is dedicated or "pinned" to a specific instance) that is "behind" another shared resource 110 (e.g., the dedicated resource 112 is commonly accessed through an operation submitted to the shared resource 110) it may be important to ensure that the shared resource 110 is never overwhelmed by a single instance, resulting in a scenario where other instances (whose dedicated resources 112 may have additional available capacity) would be unable to use the dedicated resources 112. As described herein, embodiments can prevent such an occurrence using any of a variety of techniques, such as the use of per-instance queues per resource and round robin servicing of queues 114A-1/114A-2 of a shared resource 110A.

In some embodiments, the hardware devices 102A-102B can indirectly control the apparent desirability of its hardware resources. For example, if a hardware device 102A detects that a particular instance is overloading a hardware resource and can determine that clients should direct work to other hardware resources, the hardware device 102A can increase the weight 129 for one or more (or all) queues 114/116 for that instance—and/or other instances—of resources provided by the hardware device. As a result, a client can detect a busyness of the hardware resources despite that client not even having placed many (or any) operations in its associated queue(s), and choose a different hardware resource (e.g., provided by another hardware device 102B) that has a smaller weight and thus, is less busy.

As a result, in some embodiments, by exposing the underlying busyness of the hardware resources, clients can be more intelligent about what requests they issue, and to which hardware resources these requests are sent to (via instances).

Turning to FIG. 1, two clients 104A-104B are shown that share hardware resources provided by a first hardware device 102A and a second hardware device 102B via instances 106A/106B. As shown, the first hardware device 102A shares a shared resource 110A with both client A 104A and client B 104B (via instance A1 106A-1 and instance B1 106B-1) and similarly, the second hardware device 102B shares another shared resource 110B (of a same type as shared resource 110A) with both client A 104A and client B 104B via instance A2 106A-2 and instance B2 106B-2. Moreover, client A 104A also can access two dedicated resources 112A-1/112A-2 of a same type provided by different hardware devices 102A-102B, while client B 104B can access two dedicated resources 112B-1/112B-2 of a same type provided by the different hardware devices 102A-102B.

Thus, each client 104A-104B has a choice regarding which resource to use for different types of operations. For operations needing a first type of resource, either shared resource 110A or shared resource 110B could be selected. For operations needing a second type of resource, one of the dedicated resources (112A-1 or 112B-1 for client A 104A; 112A-2 or 112B-2 for client B 104B) could be selected.

As show in FIG. 1 at circle '1A' and circle '1B', hardware resources have associated per-instance queues 114/116, and each per-instance queue also has a corresponding queue weight 129A-129B. For example, as both client A 104A and client B 104B are sharing shared resource 110A, each client has visibility into an assigned queue—queue SA1 114A-1 (for instance A1 106A-1) and queue SB1 114A-2 (for instance B1 106B-1). Thus, the clients 104A-104B can issue requests (via an instance 106A-1/106B-1) for the shared resource 110A to perform operations by causing an operation to be placed into the queue assigned to that instance that is managed/utilized by the shared resource 110A.

In some embodiments, each per-instance queue also has a queue weight 129A-129B that indicates a weight (or "heaviness") of operations in the corresponding queue. For example, in some embodiments multiple types of operations may be placed into a particular queue, and different operation types may have a same or different weight. Thus, the hardware devices 102A-102B can determine (and optionally store in a memory/storage location) queue weights 129 based on the numbers and types of operations that are in the queues.

Figure 2:
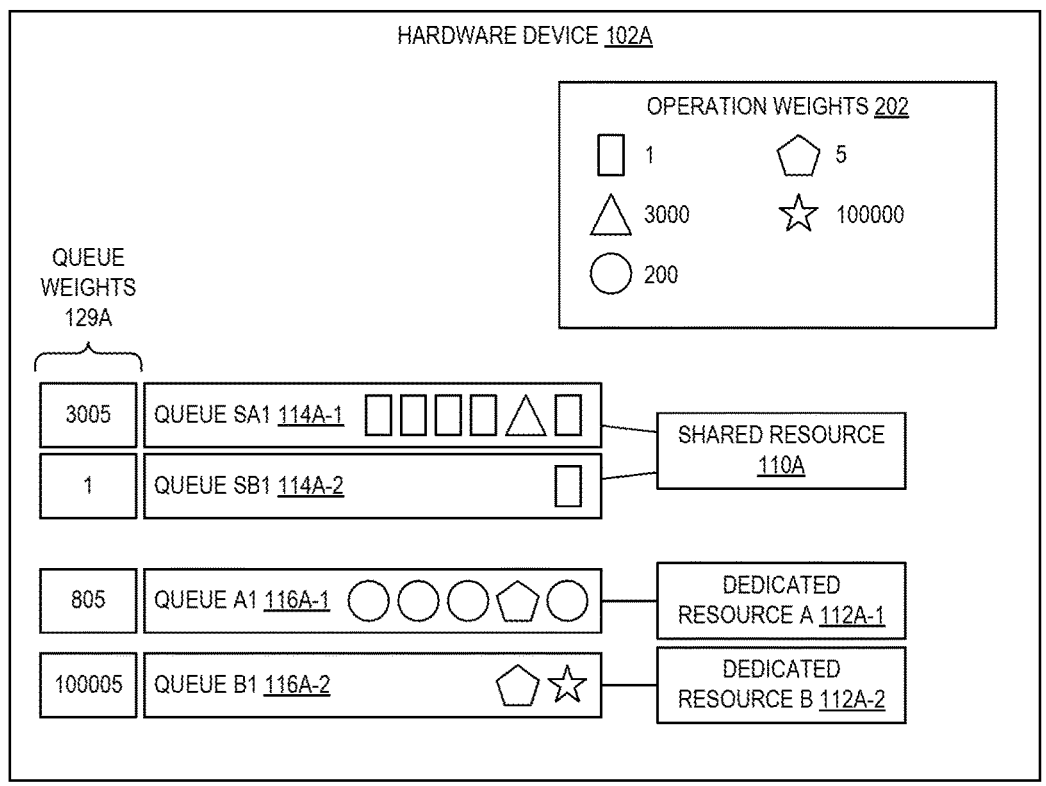
FIG. 2 is a diagram illustrating heterogeneous operations in queues and queue weights useful in an environment for deep-inspection weighted round robin of multiple virtualized resources according to some embodiments.
Figure 2:
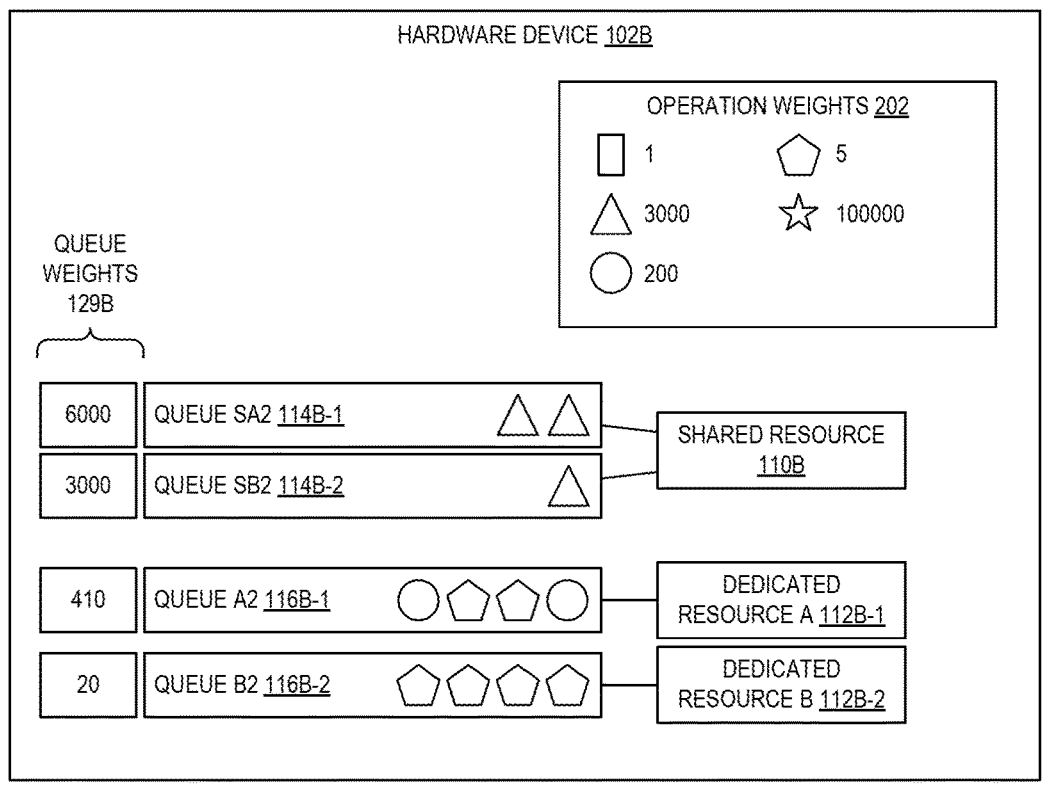

For example, FIG. 2 is a diagram illustrating heterogeneous operations in queues and queue weights useful in an environment for deep-inspection weighted round robin of multiple virtualized resources according to some embodiments. In this figure, a variety of requested operations of a variety of types are shown using different shapes. For example, the shared resource 110A of the first hardware device 102A has a first queue SA1 114A-1 (for a first instance) with five "square" operations and one "triangle" operation, whereas a second queue SB1 114A-2 (for a second instance) has a single square operation.

The hardware devices 102 can utilize a set of defined operation weights 202 that indicate, for a particular operation, what its associated weight is. In this case, each operation weight is a numeric value (e.g., a number of clock cycles to perform the operation, a number of instructions needed to be executed to perform an operation, etc.) where larger numbers represent a "heavier" weight and smaller numbers represent a "smaller" weight. In different embodiments, though, the weights can be of a variety of formats and types. For example, in some embodiments an operation weight 202 could be one of "heavy" or "light" (or heavy, medium, light, etc.), and thus could be one of a limited set of values.

As shown, the set of defined operation weights 202 indicates that a square operation has a weight of 1, a triangle operation has a weight of 3000, a circle operation has a weight of 200, a pentagon operation has a weight of 5, and a star operation has a weight of 100,000.

With a defined set of operation weights 202, the hardware devices 102A-102B can thus determine current weights of each queue 114/116. This determination can be performed periodically (e.g., every second, etc.), or performed based on changes to the queue such as upon an addition of a new operation to a queue, removal of an operation from a queue, etc.

At this point in time reflected by the figure, the queue weights 129A for the shared resource 110A are "3005" and "1" (for queue SA1 114A-1 and queue SB1 114A-2) and the queue weight for the dedicated resource A 112A-1 is "805" while the queue weight for the dedicated resource B 112A-2 is "100005." Additionally, the queue weights 129B for the shared resource 110B are "6000" and "3000" (for queue SA2 114B-1 and queue SB2 114B-2) and the queue weight for the dedicated resource A 112B-1 is "410" while the queue weight for the dedicated resource B 112B-2 is "20." Of course, in scenarios involving more instances—potentially even a large number more (e.g., 10, 100, etc.)—sharing the shared resource 110A, additional per-instance queues can be maintained. Thus, the depiction of only two instances and two queues 114A-1/114A-2 is a simple example.

In some embodiments, to assist in ensuring fairness, the shared resources 110A can process operations between the per-instance queues 114 according to a round robin type technique to ensure that no one instance, and thus no one client or group of clients, monopolizes the shared resources 110. For example, in some embodiments the shared resources 110 could perform a particular number of cycles, operations, instructions, etc., for an instance before moving on to a next instance queue. As another example, the shared resources 110 could be adapted to perform a more complex amount of work for a particular instance queue during each round—e.g., in a scenario where operation weights are either heavy, medium, or light, a shared resource 110A may perform up to ten light operations, five medium operations, and one heavy operation in a pass before moving onto another instance's queue.

Turning back to FIG. 1, at circles 2A, 2B, 2C, and 2D the queue weights 129 can be communicated back to the involved clients 104. For example, in some embodiments the weights 130A for those queues corresponding to client A 104A maintained at the hardware device 102A—i.e., queue SA1 114A-1 and queue A1 116A-1—are communicated back to client A 104A (e.g., via the instances). The clients 104, at circles '3A' and '3B', can thus update a set of locally-tracked weights 120A-120B with the current (or "most recent") queue weights for each type of resource available to the client—e.g., shared resource weights 122, dedicated resource weights 124, etc.

The weights 130 can be communicated to the clients 104 in a variety of ways in a variety of embodiments. For example, in some embodiments one or more weights can be included in response messages sent to clients (e.g., by instances) that return one or more results from performing one or more other, previously-submitted operations. Alternatively, in some embodiments the hardware devices 102 (or instances 106, or the resources themselves) can send the weights to clients according to a schedule—e.g., on a periodic basis. Further, in some embodiments, a combination of these techniques can be utilized—e.g., weights 130 can be periodically sent (in messages) and also sent in "response" messages; alternatively, weights 130 may be periodically sent only if the weights have not been sent in a "response" message in a recent amount of time (e.g., since a previous periodic weight transmission). Additionally, in some embodiments, a client 104 can send a message to specifically ask for an instance to return a response including the weights.

The type of weight transmission mechanism employed can differ based on the particular characteristics of the operating environment. For example, clients may be configured to periodically request weights in some environments in which it is useful for the clients to be able to detect non-responsive hardware devices 102. However, in some environments in which there are a large number (e.g., thousands or more) of shared hardware devices 102, it may be most efficient for the instances 106 to send updates on their own to avoid the need for each client to keep track of when it has last queried for weight information from each of these devices, which can allow for the client 104 logic needed to maintain weight information to remain simple.

With the tracked weights 120A-120B, the clients 104A-104B can intelligently determine which resource should be used to perform a particular operation that will most likely be able to service the operation—or operations—according to a desired outcome (e.g., which resource would likely perform the operation the quickest). Thus, at circle '4', an application 118B may submit a request to client B 104B to perform a particular operation. The client B 104B can identify what type of operation is being requested to identify which resources are able to (or best suited to) perform the operation. For example, a client 104 may include logic that maps operation types to types of resources that can perform the operation—e.g., whether it is a type of shared resource, a type of dedicated resource, etc. The client B 104B at circle '5' may then consult the set of weights associated with resources that can perform the operation, which could involve use of a weighted fair queuing technique to ensure that operations are distributed to where the corresponding load is lightest.

For example, according to the weights depicted in FIG. 2, the client may determine that for an operation it needs to utilize either shared resource 110A or shared resource 110B. The client B 104B may then compare the weights of the queues corresponding to these shared resources 110 to determine which shared resource is to be used. In this case, the queue weights of queue SB1 114A-2 and queue SB2 114B-2 (of "1" and "3000") can be compared to identify a smallest weight (here, "1") and thus, the desired shared resource to use (here, shared resource 110A of hardware device 102A). Thus, at circle '6', client B 104B can send a request to perform the operation to the hardware device 102A providing the desired resource, resulting in an operation being added to the queue SB1 114A-2, which causes the weight of the queue to be changed, and processed at some point by the shared resource 110A.

As another example, client B 104B may have multiple operations that need to be performed (e.g., from multiple requests received from the application 118B and/or other applications). If a group of the multiple operations all require a same type of hardware resource, client B 104B can intelligently determine which hardware resource—or even multiple hardware resources—should be used to best service these operations. For example, instead of sending a group of 100 "heavy" operations to a hardware resource having a "current" smallest queue weight (which might take a very long time to complete, during which time other hardware resources may have lower queue weights), the client 104 can intelligently spread these operations across multiple hardware resources in such a manner that the overall time to complete the operations is minimized. As one example, the queue weights can be used in a probabilistic manner—e.g., if a first queue is weighted three times as much as a second queue, the client could distribute the operations by sending 75% to the first queue and 25% to the second queue. Alternatively, a client could—with a group of operations—determine that a first number of them are to be sent to a first queue, at which time the client can a priori determine that the second queue would then become the lowest weighted queue, and cause a next operation to be designated to be sent to the second queue, and so on. Thus, even though the client may not always have a completely accurate view of the weights of queues at any point in time, the client can intelligently predict how the various queues will be serviced, especially with regard to the current operations that the client is attempting to place.

Notably, the procedure for providing weights to clients is not primarily used to communicating to the clients as to how much the queues are backing up, but instead is used to ensure fairness to make sure all operations can be performed as efficiently as possible. Thus, in contrast to other systems for using queues and/or queue weights (e.g., traffic shaping environments, or priority queues for Internet Protocol (IP) type traffic), in some embodiments these weights are explicitly provided back to the clients to allow the clients to be smarter about selecting a resource. In other such systems, even if a client were to keep track of its own work and determine that one resource (e.g., a network interface) is busy, the client has no idea which of other available interfaces might be available or better until the client starts trying, whereas embodiments described herein can quickly identify a "best" other resource.

Accordingly, in some embodiments clients can now be much more intelligent when compared to other previous systems. In those systems, it often may be the case where, if there are ten clients, a small number (e.g., one or two) of these clients may generate 99% of the overall workload for the resources. As a result, the rest of the clients have no idea as to what is going on, so the first time one of these clients attempts to do something (e.g., request execution of an operation), the client will likely make a bad choice as it doesn't know what the current state of the various resources is, so a client's request will often see very poor performance. At scale, when there are many clients and many hardware resources, this can become a tremendous inefficiency. For example, if all clients for some service are busy and a "new" client is added (e.g., for additional capacity), this new client will be clueless as to where to issue a request to perform an operation. If there are one hundred underlying resources, and ninety of them are very busy, there is an incredibly high chance the new client will make multiple bad decisions about where to originate operation requests. Thus, a bad queue warming problem is introduced, as it takes a fairly long amount of time (and requests) for a new client to figure out the state of the overall system, and then be able to perform well. In contrast, in some embodiments a new (or existing) client can quickly identify the current state of all resources of interest and thus, quickly identify which resources will likely be a best candidate.

Similarly, although the generic concept of weighted fair queuing is employed in other systems, it does not appear to have been applied to environments with underlying virtualized shared resources. In contrast, existing systems involving ensuring fairness for virtualization focus upon scheduling algorithms that hypervisors may use to ensure fairness between VMs. However, such techniques are inapplicable in the environments involved herein, as a VM itself is not aware of the scheduling of the underlying hardware (e.g., cores, etc.), is limited to using a single set of underlying hardware resources, and thus cannot choose between different ones (or types) of hardware resources.

Figure 3:
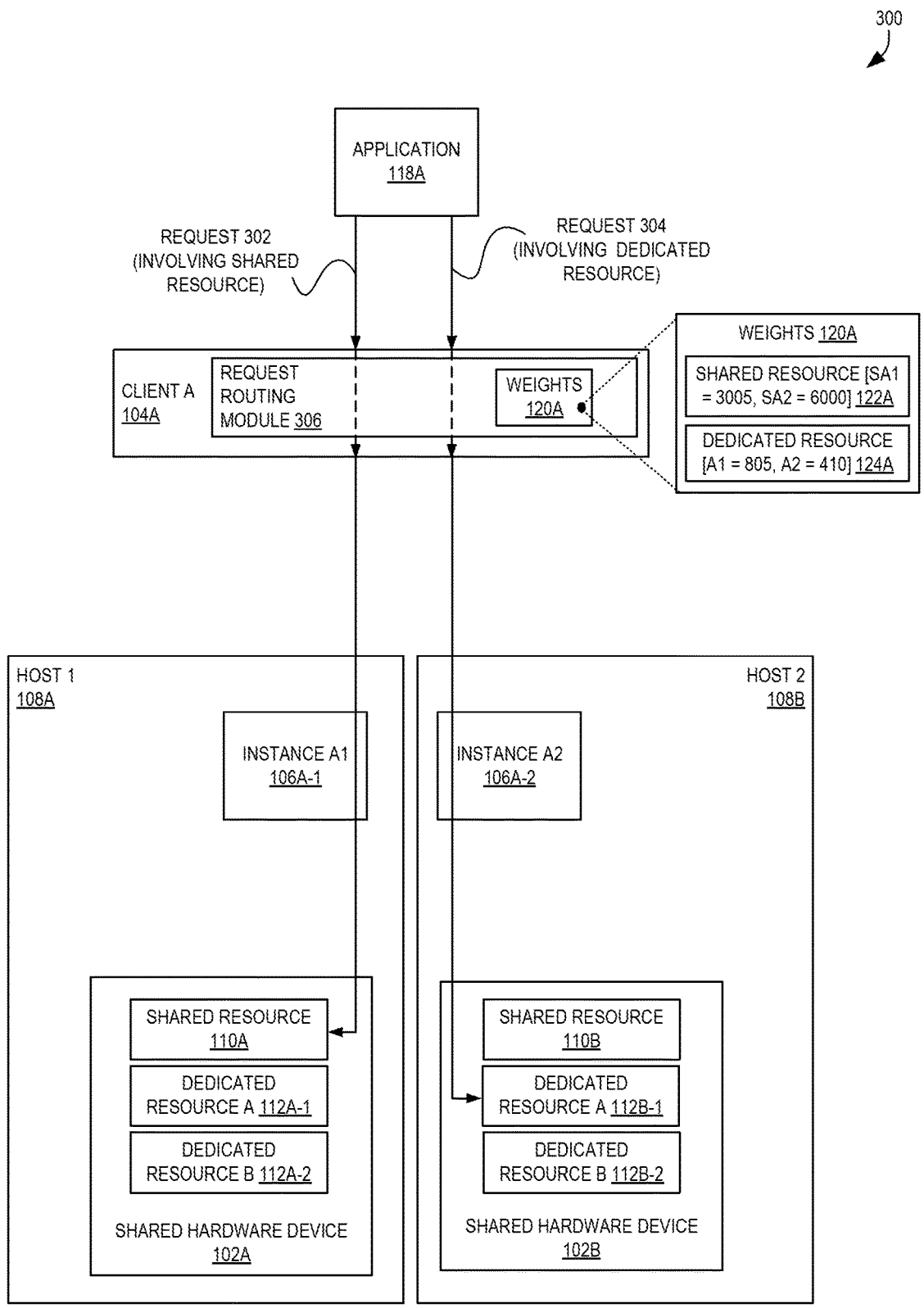
FIG. 3 is a block diagram illustrating client-controlled intelligent resource selection using queue weights according to some embodiments.

As another example, FIG. 3 is a block diagram illustrating an environment 300 for client-controlled resource selection using queue weights according to some embodiments. FIG. 3 shows an example using the exemplary weights 120A of FIG. 2. As shown, an application 118A may issue a first request 302 to client A 104A to perform an operation. The first request 302 can be determined, by a request routing module 306 (e.g., a software application or portion thereof, such as a function, method, etc.) of client A 104A, to involve (or require use of) a hardware resource of a first type. The request routing module 306 can perform a selection technique, e.g., a simple selection of a lowest weight, a weighted round robin technique, etc., using the shared resources weights 122A to identify that shared resource 110A is the optimal selection for the operation, causing the request (or a similar request) to be sent via an instance A1 106A-1 into the instance's queue (not illustrated) to be processed by shared resource 110A.

Similarly, the application 118A may issue a second request 304 to client A 104A to perform another operation. The second request 304 can be determined, by the request routing module 306 of client A 104A, to involve (or require use of) a dedicated resource of a second type. The request routing module 306 can perform a selection technique, e.g., a selection of a lowest weight, a weighted round robin technique, etc., using the dedicated resources weights 124A (of resources of the second type) to identify that dedicated resource A 112B-1 is the optimal selection, causing the request (or a similar request) to be sent via an instance A2 106A-2 into the instance's queue (not illustrated) to be processed by dedicated resource 112B-1.

Figure 4:
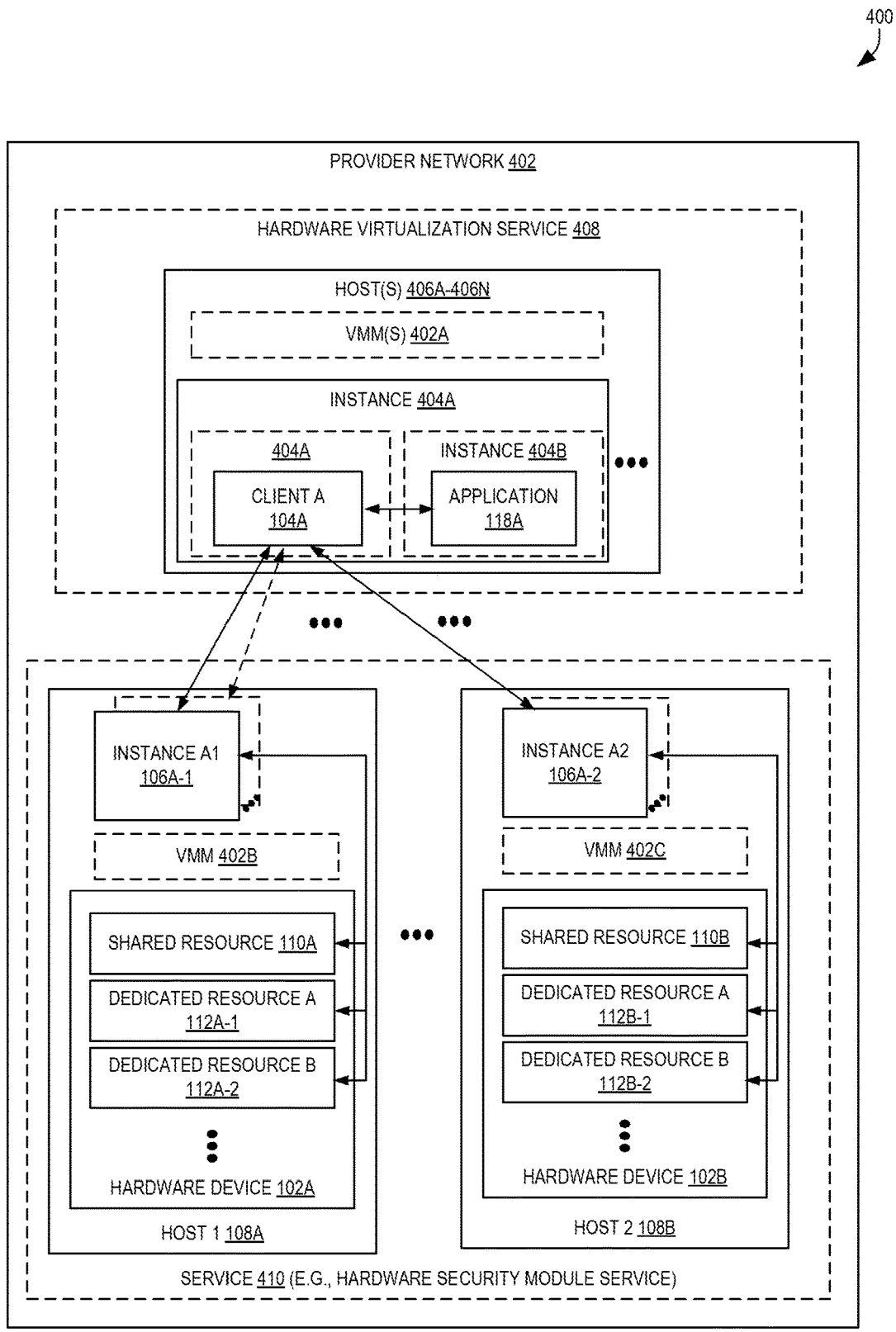
FIG. 4 is a block diagram illustrating a provider network environment utilizing client-guided deep-inspection weighted round robin of multiple virtualized resources according to some embodiments.

FIG. 4 is a block diagram illustrating a provider network 402 environment 400 utilizing deep-inspection weighted round robin of multiple virtualized resources according to some embodiments.

A provider network 402 may provide users the ability to utilize one or more of a variety of types of computing-related resources such as compute resources (e.g., executing VM instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service 408 that can execute compute instances, a storage virtualization service that can store data objects, etc. The users (or "customers") of a provider network 402 may utilize one or more user accounts that are associated with a customer account, though these terms may be used somewhat interchangeably depend ending upon the context of use. Users may interact with a provider network 402 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 402 that includes "backend" services supporting and enabling the services that may be more directly offered to customers.

To provide these and other computing resource services, provider networks 402 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

As shown, in some embodiments the provider network includes one or more hosts 406A-406N that may execute one or more compute instances 404A-404B (optionally, e.g., as VMs executing with the support of one or more virtual machine monitors (VMMs) 402A) upon which client A 104A and application 118A execute. Client A 104A can receive requests from the application 118A, and send requests to perform operations to one or more instances 106A-1/106A-2 (that may use VMMs 402B-402C) of hosts 108 of a service 410 (e.g., a hardware security module service) that can utilize resources 110/112 of hardware devices 102. In some embodiments, a client may interact with a single instance (at a particular host) providing access to one or more resources of a hardware device, though in other embodiments, it is also possible for a client to potentially interact with multiple instances at a particular host—e.g., a first instance could provide access to a first one or more resources (perhaps a shared resource and a first set of dedicated resources), while a second instance could provide access to a second one or more resources (perhaps the same shared resource and a second set of dedicated resources), etc.

Figure 5:
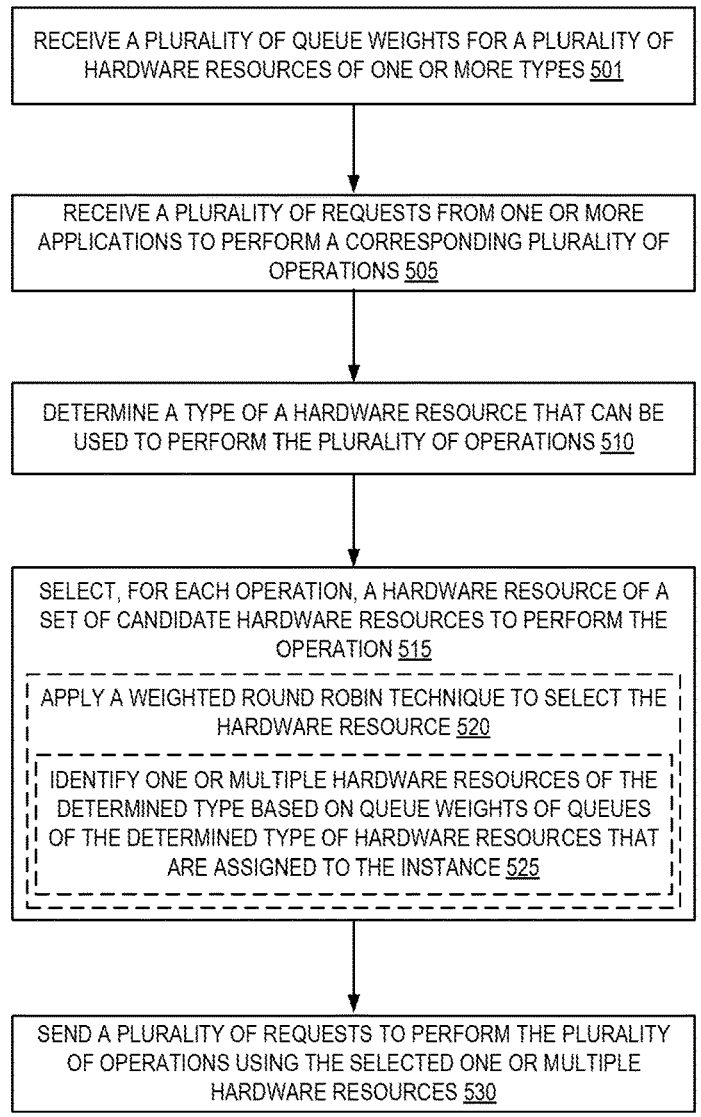
FIG. 5 is a flow diagram illustrating operations for intelligent resource selection in a system employing client-guided deep-inspection weighted round robin of multiple virtualized resources according to some embodiments.

FIG. 5 is a flow diagram illustrating operations 500 for intelligent resource selection in a system employing deep-inspection weighted round robin of multiple virtualized resources according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a client 104 of the other figures.

The operations 500 include, at block 501, receiving a plurality of queue weights for a plurality of hardware resources of one or more types. The plurality of hardware resources may be virtualized hardware resources. Each of the hardware resources may have one or more queues to store operations, where each queue is assigned to a particular instance that serves clients. Each hardware resource may service its corresponding one or more queues according to a round robin scheme, each time executing a number of operations from the queue, a number of clock cycles, an amount of time, etc. A hardware resource may comprise, for example, a general-purpose or special-purpose processor.

The operations 500 include, at block 505, receiving a plurality of requests from one or more applications to perform a corresponding plurality of operations. Each operation may need to be performed by one of the hardware resources The operations 500 include, at block 510, determining a type of a hardware resource that can be used to perform the plurality of operations. The determining may include, for each request, identifying a type of the corresponding operation by identifying an identifier of the operation from the request, and consulting a stored mapping of operation identifiers to identifiers of the type of needed hardware resource.

The operations 500 include, at block 515, selecting, for each operation, a hardware resource from a set of candidate hardware resources to perform the operation. In some embodiments, the block 515 optionally includes, at block 520, applying a weighted round robin technique to select the hardware resource(s). Block 520 may include, for example, block 525 and identifying one or more multiple hardware resources of the determined type based on queue weights of those queues of the determined type of hardware resources that are assigned to the instance. The queue weights may be stored in a queue weight data structure and may be updated upon a client receiving a "current" weight for the queue from the hardware resource. For example, in some embodiments a single hardware resource may be selected to perform all of the plurality of operations when the effect of adding the plurality of operations would result in the queue's weight still being smaller than a next smallest queue weight of hardware resources of that type. As another example, in some embodiments multiple hardware resources may be selected according to a weighted round robin scheme so that the operations are distributed between those hardware resources.

The operations 500 include, at block 530, sending a plurality of requests to perform the plurality of operations using the selected one or multiple hardware resources. Each request may be sent to a compute instance executed by a host device, where the corresponding selected hardware resource is provided by a hardware device (e.g., a "card") coupled with the host device over an interface or bus. The sending of the request may cause an operation to be inserted into a queue assigned to the instance that is serviced by the selected hardware resource.

Figure 6:
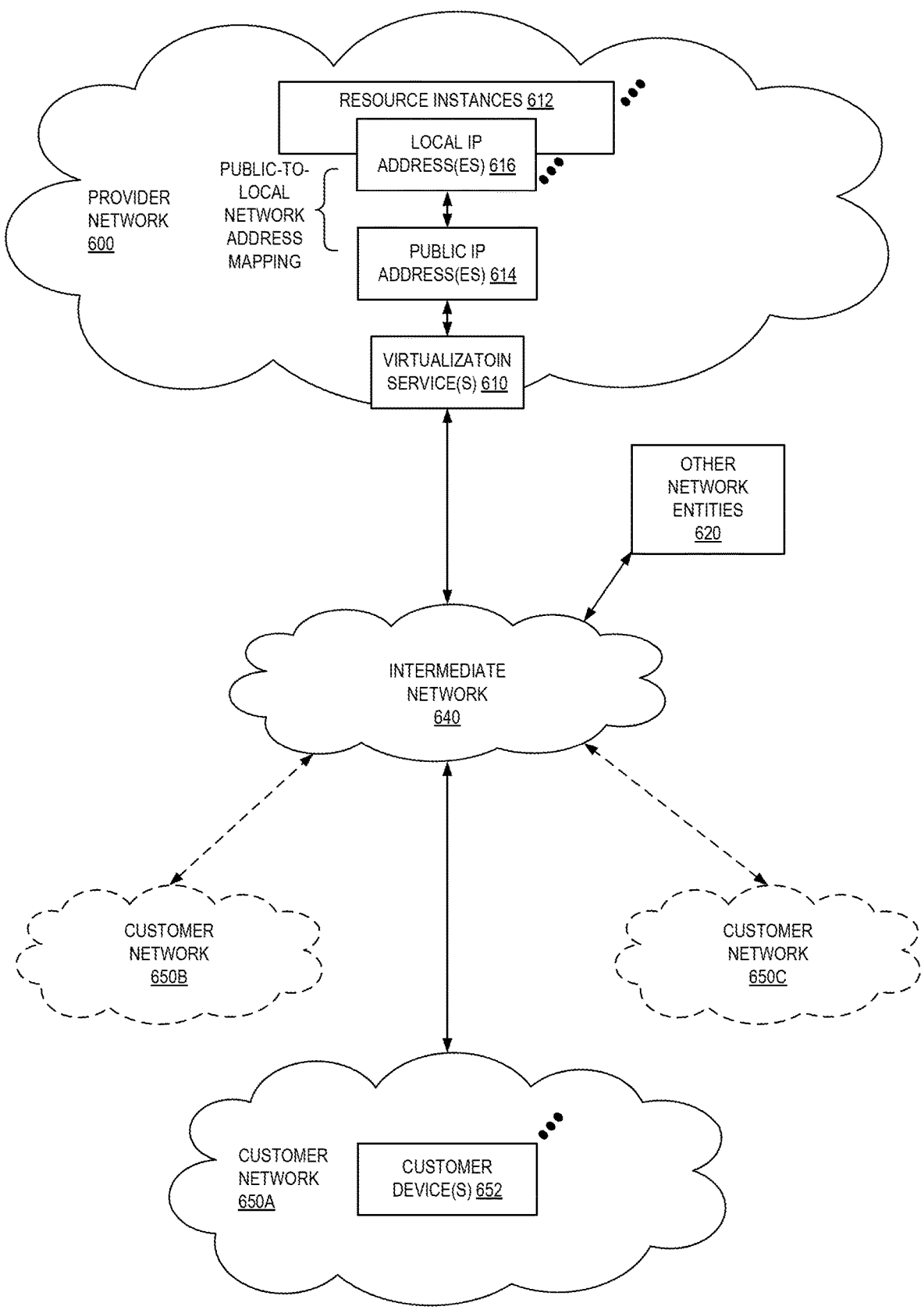
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
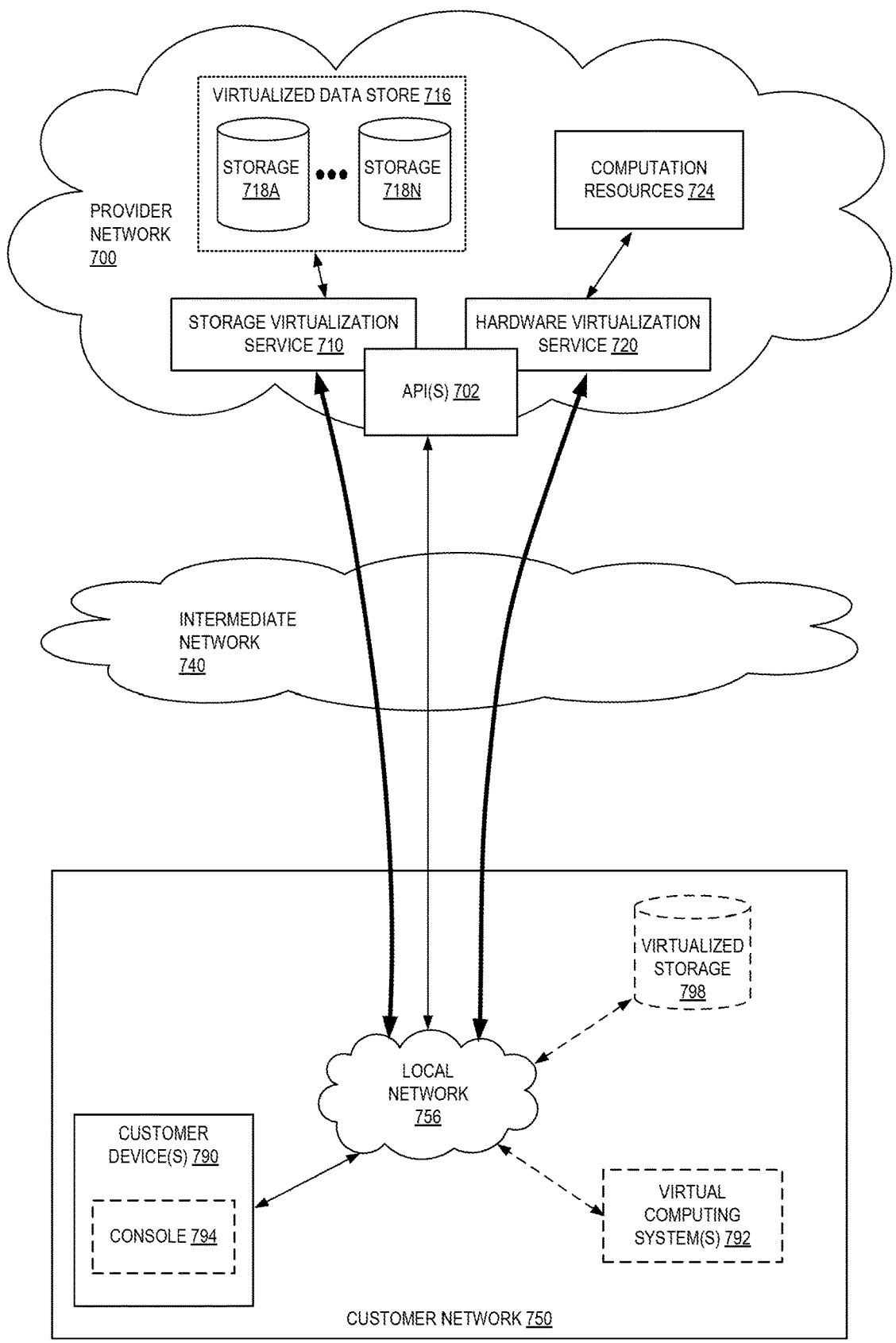
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
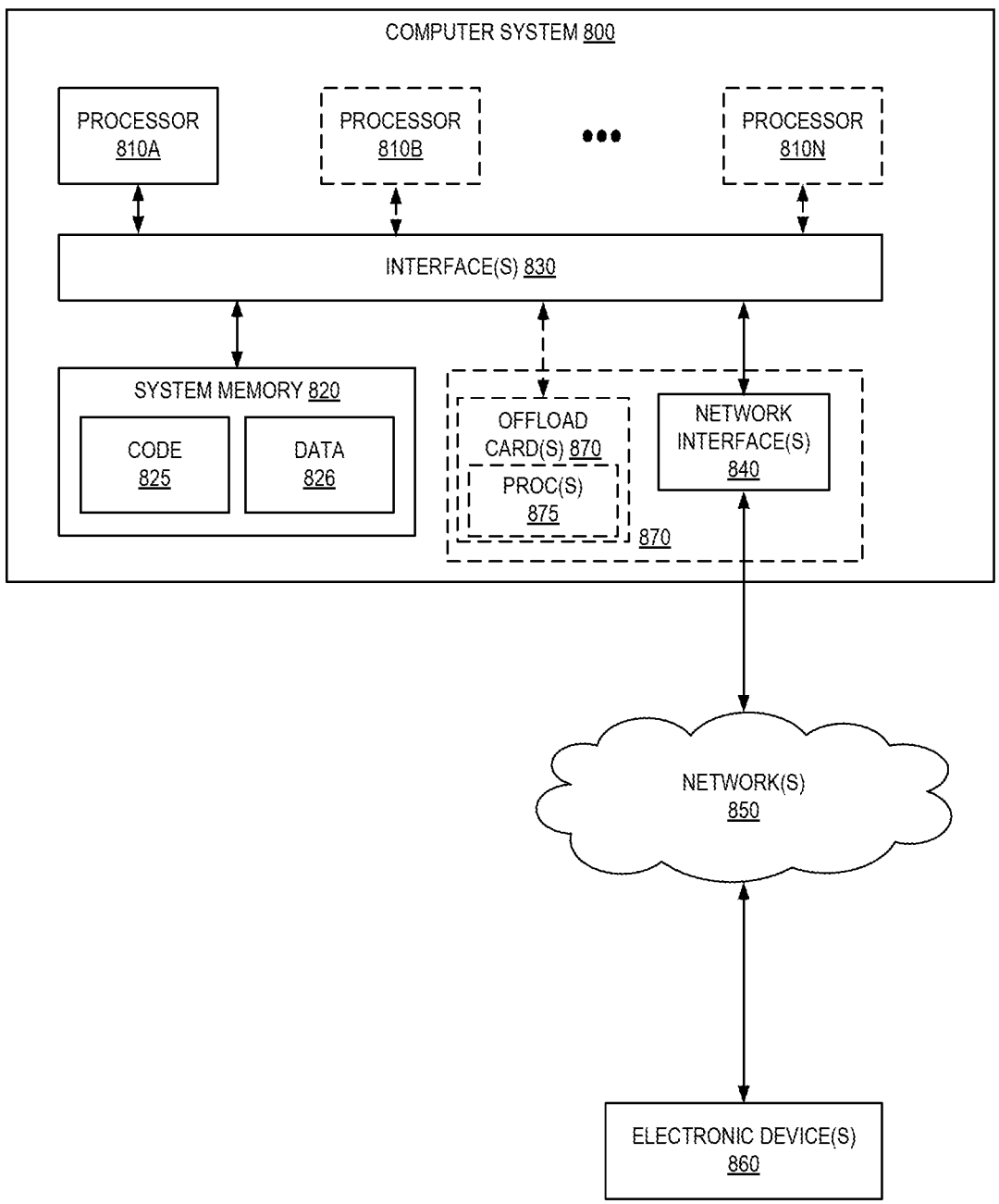
FIG. 8 is a block diagram illustrating an example computer system that may be used in some embodiments.

In some embodiments, a system that implements a portion or all of the techniques for deep-inspection weighted round robin of multiple virtualized resources as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-e) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities, and may not coordinate with (or service) any hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally, a computer-accessible medium may include non-transitory storage media or memory media such as magnetic or optical media, e.g., disk or Digital Video Disc (DVD)/Compact Disc (CD) coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102B, 120A-120B, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a client executed by a first computing device, a first message including a first current weight of operations in a first queue for a first hardware resource of a first type, wherein the first current weight is based on a first weight of a first operation within the first queue and further based on a second weight of a second operation within the first queue, wherein the first weight and the second weight are different, and wherein the first hardware resource is provided by a second computing device;
receiving, at the client, a second message including a second current weight of operations of a second queue for a second hardware resource of the first type;
determining, by the client, that a need exists to perform an operation using a hardware resource of the first type, the determining comprising receiving a request from an application;
determining, by the client, that the operation should be performed using the first hardware resource based at least in part on an analysis involving the first current weight and the second current weight;
sending, by the client, a first request to perform the operation using the first hardware resource;
receiving, at the client, a plurality of requests from one or more applications to perform a plurality of operations;
determining, by the client, that each of the plurality of operations should be performed using some hardware resource of the first type;
determining, according to a weighted round robin algorithm, that a first one or more of the plurality of operations are to be performed using the first hardware resource and that a second one or more of the operations are to be performed using the second hardware resource;
sending, by the client, a first one or more requests to perform the first one or more operations using the first hardware resource; and
sending, by the client, a second one or more requests to perform the second one or more operations using the second hardware resource.

2. The computer-implemented method of claim 1, further comprising:
receiving a plurality of messages indicating a corresponding plurality of current weights of operations in the first queue, wherein the plurality of messages were sent by the second computing device according to a schedule.

3. The computer-implemented method of claim 1, wherein the first message comprises a response message sent by the second computing device responsive to a previous request sent by the client to perform a previous operation.

4. The computer-implemented method of claim 1, wherein the first queue is assigned to a first instance that is executed by the second computing device, and wherein a third queue for the first hardware resource exists that is assigned to a second instance that is also executed by the second computing device.

5. The computer-implemented method of claim 4, wherein the first hardware resource services a plurality of queues according to a round robin scheme, wherein the plurality of queues includes the first queue and the third queue.

6. The computer-implemented method of claim 4, further comprising:
receiving, at the client, a third message indicating a third current weight of operations in a fourth queue assigned to the first instance that is for a third hardware resource of a second type that is also provided by the second computing device,
wherein the determining that the operation should be performed using the first hardware resource is further based on determining that the operation requires a hardware resource of the first type.

7. The computer-implemented method of claim 1, wherein:
the second computing device comprises a first one or more processors and further comprises a card that is coupled with the first one or more processors over one or more buses;
the card includes a second one or more processors; and
the first hardware resource comprises one of the second one or more processors.

8. A system comprising:
a first computing device to provide access to a first hardware resource of a first type via a first plurality of queues assigned to a first one or more instances;
a second computing device to provide access to a second hardware resource of the first type via a second plurality of queues assigned to a second one or more instances; and
a client that is to be executed by a third computing device, the third computing device including instructions that upon execution cause the client to:
receive a first message including a first current weight of operations of a first queue of the first plurality of queues for the first hardware resource wherein the first current weight is based on a first weight of a first operation within the first queue and further based on a second weight of a second operation within the first queue, wherein the first weight and the second weight are different;
receive a second message including a second current weight of operations of a second queue of the second plurality of queues for the second hardware resource;
determine that a need exists to perform an operation using a hardware resource of the first type based on receipt of a request from an application;
determine that the operation should be performed using the first hardware resource based at least in part on an analysis involving the first current weight and the second current weight;
send a first request to the first computing device to perform the operation using the first hardware resource;
receive a plurality of requests from one or more applications to perform a plurality of operations;
determine that each of the plurality of operations should be performed using some hardware resource of the first type;
determine, according to a weighted round robin algorithm, that a first one or more of the plurality of operations are to be performed using the first hardware resource and that a second one or more of the operations are to be performed using the second hardware resource;
send a first one or more requests to perform the first one or more operations using the first hardware resource; and
send a second one or more requests to perform the second one or more operations using the second hardware resource.

9. The system of claim 8, wherein the first message comprises a response message sent by the first computing device responsive to a previous request sent by the client to perform a previous operation.

10. The system of claim 8, wherein the first message is one of a plurality of messages sent by the first computing device that indicate a corresponding plurality of current weights of operations for the first queue.

11. The system of claim 8, wherein the first computing device further is to provide access to a third hardware resource of a second type via a third plurality of queues.

12. The system of claim 8, wherein the first hardware resource is to service operations from the first plurality of queues according to a round robin scheme.

13. A computer-implemented method comprising:
receiving, at a client executed by a first computing device, a first message including a first current weight of operations in a first queue for a first hardware resource of a first type, wherein the first current weight is based on a first weight of a first operation within the first queue and further based on a second weight of a second operation within the first queue, wherein the first weight and the second weight are different, wherein the first hardware resource is provided by a second computing device, wherein the first queue is assigned to a first instance that is executed by the second computing device, and wherein a third queue for the first hardware resource exists that is assigned to a second instance that is also executed by the second computing device;
receiving, at the client, a second message including a second current weight of operations of a second queue for a second hardware resource of the first type;
receiving, at the client, a third message indicating a third current weight of operations in a fourth queue assigned to the first instance that is for a third hardware resource of a second type that is also provided by the second computing device,
determining, by the client, that a need exists to perform an operation using a hardware resource of the first type;
determining, by the client, that the operation should be performed using the first hardware resource based at least in part on an analysis involving the first current weight and the second current weight and further based on the determining that the operation requires a hardware resource of the first type; and
sending, by the client, a first request to perform the operation using the first hardware resource.

14. The computer-implemented method of claim 13, further comprising:
receiving a plurality of messages indicating a corresponding plurality of current weights of operations in the first queue, wherein the plurality of messages were sent by the second computing device according to a schedule.

15. The computer-implemented method of claim 13, wherein the first message comprises a response message sent by the second computing device responsive to a previous request sent by the client to perform a previous operation.

16. The computer-implemented method of claim 13, wherein the first hardware resource services a plurality of queues according to a round robin scheme, wherein the plurality of queues includes the first queue and the third queue.

17. The computer-implemented method of claim 13, wherein:
the second computing device comprises a first one or more processors and further comprises a card that is coupled with the first one or more processors over one or more buses;
the card includes a second one or more processors; and
the first hardware resource comprises one or more of the second one or more processors.

18. The computer-implemented method of claim 13, wherein the determining, by the client, that the need exists to perform the operation using the hardware resource of the first type comprises receiving a request from an application.

19. The computer-implemented method of claim 18, wherein the application is executed by a third computing device that is separate from the first computing device and the second computing device.

* * * * *